E. W. LEECH, Jr.
NON-SKID TIRE PROTECTOR.
APPLICATION FILED APR. 26, 1921.
1,394,312.
Patented Oct. 18, 1921.
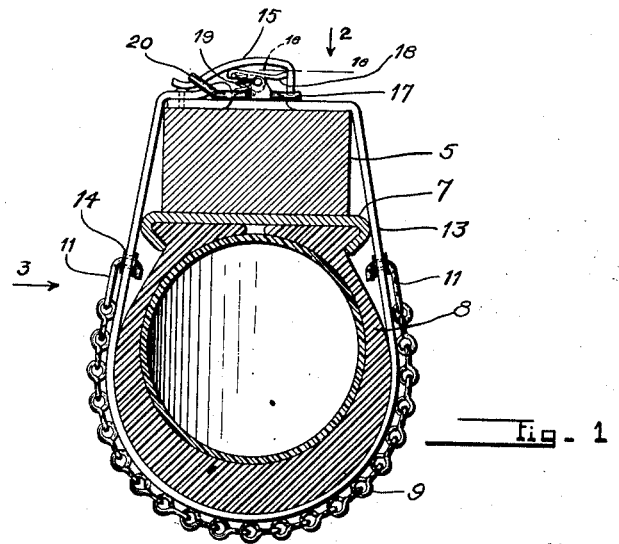
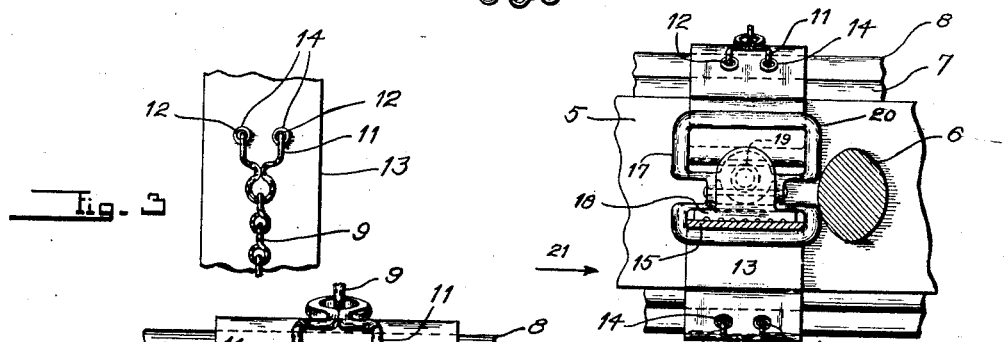
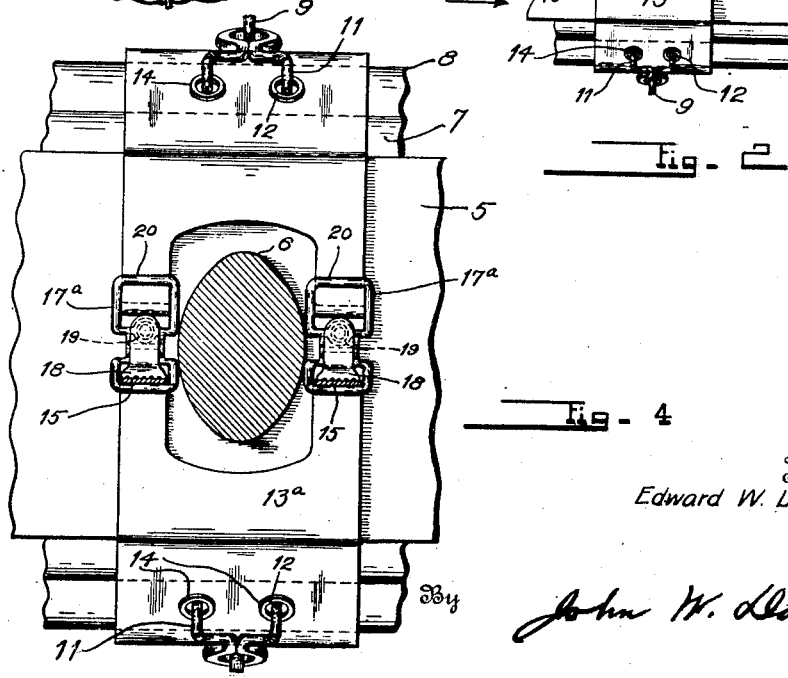
Inventor
Edward W. Leech Jr.
By John W. Darley
Attorney

UNITED STATES PATENT OFFICE.

EDWARD W. LEECH, JR., OF BALTIMORE, MARYLAND.

NON-SKID TIRE-PROTECTOR.

1,394,312.

Specification of Letters Patent.   Patented Oct. 18, 1921.

Application filed April 26, 1921. Serial No. 464,514.

*To all whom it may concern:*

Be it known that I, EDWARD W. LEECH, Jr., a citizen of the United States, residing at Baltimore, in the State of Maryland, have invented certain new and useful Improvements in Non-Skid Tire-Protectors; and I do hereby declare the following to be a full, clear, and exact description of the invention, such as will enable others skilled in the art to which it appertains to make and use the same.

My invention relates to non-skid tire protectors.

Among the objects of my invention are:

To produce a protector for pneumatic or other tires so constructed and arranged that it may be readily secured in position to prevent the tires from skidding.

To provide a protector composed of an element for producing a non-skid effect separably secured to the attaching member so that if either part is broken or if the former part is lost, a new part may be readily assembled with the remaining part.

To provide a non-skid element having a protecting means assembled therewith so that when both are in place on the tire, the protecting element will prevent the non-skid element from abrading the tire.

These and further objects of my invention will become apparent in the accompanying specification, reference being had to the accompanying drawings, in which:

Figure 1 is a section of a pneumatic tire provided with my improved protector.

Fig. 2 is a view of the parts shown in Fig. 1 looking in the direction of the arrow 2 in said figure.

Fig. 3 is a view of a portion of the protector viewed in the direction of the arrow 3 in Fig. 1. This view is to show the manner in which the non-skid element is separably secured to the protecting and attaching elements.

Fig. 4 is a view similar to Fig. 2, but showing a variation in the means for securing the ends of the attaching element.

In the drawings:—

5, 6, 7 and 8 represent, respectively, a felly, spoke, rim and tire, all of which may be of the usual or any approved construction and form no part of my invention.

The non-skid element of my protector comprises a chain 9, which has at each end a hook 11. In the drawings, each hook 11 is illustrated as provided with two bent portions, each bent portion engaging in a hole 12 provided in the attaching and protecting elements 13 and 13$^a$. (See Fig. 4.) The hole 12 may be reinforced by eyelets such as 14.

The attaching and protecting elements 13 and 13$^a$ shown in Figs. 2 and 4, respectively, are exactly the same in construction except that in Fig. 2, but one large buckle is used to secure the ends of the element 13 together, whereas in Fig. 4, two smaller buckles are used for securing the ends of the element 13$^a$ together and a recess is provided between the ends of said elements to embrace the spoke 6 in order to prevent creeping of my improved protector whether the car to which the tire is attached is going forward or backward.

The side view of the elements 13 and 13$^a$ are both the same as shown in Fig. 1. In Figs. 2 and 3, the end 15 of the elements 13 and 13$^a$ is cut off as along the line 16—16 in Fig. 1 in order to show the subjacent buckles 17 and 17$^a$. The buckles 17 and 17$^a$ may be of any approved design, either with hinged fingers, entering holes in the ends 15 or having a toothed finger 18 pressed in position against the end 15 by a spring such as 19. The buckle 17 is also provided with a guard 20 for securing the end 15. The buckle 17 is of a well-known construction and the details thereof form no part of my invention.

Any means for securing the ends of the element 13 may be used.

My improved protector is used as follows:—

Any suitable number of my improved protectors are to be secured in place upon the wheel, as shown in Figs. 1 and 2, or as in Figs. 1 and 4, according to which type of protector is used.

If the protector illustrated in Fig. 2 is used, then the element 13 is to be placed against the spoke 6 so that when the car moves forward in the direction of the arrow 21, the tendency of the element 13 to creep will be prevented by said spoke. When the type shown in Fig. 4 is used, the creeping either forward or backward, is prevented by the bifurcated ends of the element 13$^a$.

If the non-skid element becomes worn or broken in use, a new element may be readily attached in place by simply passing the ends of the hooks 11 through the holes 12. If the attaching and protecting elements 13 and 13ª become worn out or broken, new ones may be applied to the old non-skid elements 9.

It is evident from the foregoing that the element 13, in addition to forming means for securing the non-skid element 9 in place, also serves as a protector to prevent the element 9 from abrading the tire 8, and thus greatly increases the life of the tires.

While I have shown the non-skid element 9 as formed of a chain, it is to be understood that I do not desire to be limited to the use of a chain. Any element, whether composed of metal or not, and however shaped, which will prevent skidding, may be used in place of the element 9.

The element 13 may be composed of leather, rubber, a fibrous or metallic substance, the sole requirement being that it can be secured in place upon the tire.

While I have shown the buckles 17 for securing the ends of the element 13, it is to be understood that I do not desire to be limited to the use of buckles. Any securing means which will secure the ends of the element 13, I consider to be within the scope of my invention.

While I have shown the element 9 as detachably secured to the protecting element 13, I do not desire to be limited to this form of construction. The element 9 may be permanently secured to the element 13, or many means besides the hook 11 and holes 12 may be used for detachably securing the element 9 to the element 13.

While I have shown the element 13 as performing the dual functions of protecting the tire 8 from the abrading action of the non-skid element 9 and also of securing said element in place upon the wheel, yet it is to be understood that I do not desire to be limited to such a structure. The protecting element might be separate from the attaching element.

I claim:—

A non-skid tire protector comprising a strap arranged to be secured around the tire and the felly of a wheel, reinforced holes in said strap, and a chain having hooks on the end thereof detachably engaging in said holes.

In testimony whereof I affix my signature.

EDWARD W. LEECH, Jr.